United States Patent [19]
Yajima et al.

[11] Patent Number: 5,632,024
[45] Date of Patent: May 20, 1997

[54] MICROCOMPUTER EXECUTING COMPRESSED PROGRAM AND GENERATING COMPRESSED BRANCH ADDRESSES

[75] Inventors: Hiroshi Yajima, Kodaira; Yugo Kashiwagi, Tokorozawa, both of Japan

[73] Assignee: Hitachi, Ltd., Tokyo, Japan

[21] Appl. No.: 515,398

[22] Filed: Aug. 15, 1995

Related U.S. Application Data

[63] Continuation of Ser. No. 250,065, May 27, 1994, abandoned.

[30] Foreign Application Priority Data

Jun. 8, 1993 [JP] Japan .................... 5-164079

[51] Int. Cl.$^6$ ............................................ G06F 9/42
[52] U.S. Cl. .................... 395/381; 395/800; 395/580; 364/DIG. 1; 364/DIG. 2
[58] Field of Search .................... 395/375, 800, 395/400, 425

[56] References Cited

U.S. PATENT DOCUMENTS

| | | | |
|---|---|---|---|
| 4,402,044 | 8/1983 | McDonough et al. | 395/375 |
| 4,694,391 | 9/1987 | Guttag et al. | 395/800 |
| 4,839,649 | 6/1989 | Imai et al. | 341/65 |
| 4,868,570 | 9/1989 | Davis | 341/106 |
| 4,890,249 | 12/1989 | Yen | 364/578 |
| 5,155,484 | 10/1992 | Chambers, IV | 341/55 |
| 5,299,519 | 4/1994 | Hirabayashi | 112/456 |
| 5,303,356 | 4/1994 | Vassiliadis et al. | 395/375 |
| 5,307,173 | 4/1994 | Yuen et al. | 358/335 |
| 5,463,746 | 10/1995 | Brodnax et al. | 395/375 |
| 5,481,364 | 1/1996 | Ito | 358/261.1 |

FOREIGN PATENT DOCUMENTS

| | | |
|---|---|---|
| 55-131848 | 10/1980 | Japan . |
| 62-171031 | 7/1987 | Japan . |
| 2297626 | 12/1990 | Japan . |

OTHER PUBLICATIONS

Design concept and implementation & μItron specification for the H8/500 Series by Takeyama; 1989 IEEE, pp. 48–53.

Primary Examiner—William M. Treat
Assistant Examiner—Zarni Maung
Attorney, Agent, or Firm—Alan R. Loudermilk

[57] ABSTRACT

An executable program is stored in compressed form in a ROM, from which compressed program data is fetched to be expanded by an expandor to a pre-compression form. The expanded data is then decoded by an instruction decoder for execution. This novel setup reduces a memory usage amount in main storage including the ROM. If a branch instruction appears, a controller converts a pre-compression branch destination address to a corresponding post-compression branch destination address and sets a value thereof to a program counter.

27 Claims, 10 Drawing Sheets

FIG. 10

| PROGRAM | MACHINE CODE DATA |
|---|---|
| LDC.B #0, DP | 04008c |
| L: MOV.W @A, R0 | 1dff0e80 |
| LDC.B #0, DP | 04008c |
| ADD.W @B, R0 | 1dff1020 |
| LDC.B #0, DP | 04008c |
| MOV.W @0, R0 | 1dff0e80 |
| JMP L | 301000 |

(L=ADDRESS 01000)

MICROCOMPUTER EXECUTING COMPRESSED PROGRAM AND GENERATING COMPRESSED BRANCH ADDRESSES

This application is a continuation of application Ser. No. 08/250,065 filed on May 27, 1994 now abandoned.

BACKGROUND OF THE INVENTION

This invention relates to a method in which a predetermined operation is performed by executing a series of instructions constituting a program and to a microcomputer for implementing this method and, for example, to a technology effectively applicable to a microcomputer including a CPU (Central Processing Unit) and a memory on one chip (hereinafter referred to also as a single-chip microcomputer).

The single-chip microcomputer is arranged with required peripheral circuitry around the CPU on one semiconductor substrate and is incorporated with a ROM (Read-only Memory) for storing a program for operating the computer system. A multi-chip microcomputer does not incorporate such a ROM, instead getting the necessary operating program from an external memory (ROM) arranged outside the computer system.

In the above-mentioned signal-chip microcomputer, an instruction stored in main storage such as the program ROM is adapted to be directly read into the CPU. Hence, as a program size grows, it becomes necessary to increase the capacity of the main storage accordingly. However, the increased capacity necessarily expands an occupational area of the main storage in the semiconductor chip, eventually leading to increased production cost.

To solve such a problem, a method is proposed, as disclosed in Japanese Non-examined Patent Publication No. 55-131848, in which a program is stored in an auxiliary storage device in a compressed form and is expanded before being loaded into a main storage.

SUMMARY OF THE INVENTION

The technique according to the above-mentioned disclosure can make a storage size of the auxiliary storage device appear increased by reducing the size of the program stored in the auxiliary storage device. However, since the compressed program is expanded before being loaded into the main storage, a storage size of the main storage cannot be especially reduced. In a microcomputer-based system, it is important to make the RAM size as small as possible by reducing the amount of memory used by the system, thereby keeping the cost of the entire system as low as possible.

It is therefore an object of the present invention to provide a technique for reducing an amount of usage of the main storage.

Another object of the present invention is to provide a technique for minimizing a reduction in program executing speed that may otherwise be caused by the above-mentioned reduced usage amount of the main storage.

Other and further objects, features and advantages of the invention will appear more fully from the following description and the accompanying drawings.

The present invention will be outlined in the following primary aspects thereof.

A program is first compressed and put in a storage device. Then, data of the compressed program stored in the storage device is fetched and expanded to reproduce an instruction code. The reproduced instruction code is decoded for execution. If the instruction code represents an instruction involving a change in program execution sequence, a destination address at which the instruction execution sequence is changed is converted to a corresponding destination address in the compressed program. The resultant address is set to a program counter.

If, of the instructions constituting the program, only main instructions are compressed, all fetched data need not be expanded. This makes it possible to determine if it is necessary to make expansion each time data is fetched, thereby expanding the data only when required.

A microcomputer system that contains a program counter for specifying an address (instruction address) at which an instruction to be executed is located and decodes a series of instructions constituting a program for executing a predetermined arithmetic operation comprises a storage device for storing compressed program data, an expansion device for expanding the compressed data fetched from the storage means to obtain an instruction code, and a decoder for decoding the instruction code. If the expanded instruction code is one that changes a program execution sequence, the microcomputer system further comprises an address translating device for converting a destination address at which the instruction executing sequence is changed into a destination address in the compressed program and a program counter setting device for setting the converted destination address to the above-mentioned program counter. In this case, a determination device is also provided for determining if it is necessary for the program data to be expanded every time it is fetched, the program data being expanded accordingly.

In an preferred embodiment of the invention, a translation rule table is provided for expanding the program data fetched from the storage device into a form in which the program data was arranged prior to the expansion. By searching the translation rule table, a specific instruction is expanded into the pre-compression form. Further, an address translation table is provided for converting the destination address at which the instruction sequence is changed to the corresponding destination address in the compressed program.

As mentioned and according to the above-mentioned novel setup, an instruction is fetched from the storage device in which the compressed program is stored and the fetched instruction is expanded into pre-compressed form for execution. Therefore, this setup eliminates the necessity for expanding the compressed program before fetching it, resulting in a reduced memory usage amount in the storage device. Also, obtaining the destination address through the translation table minimizes reduction in program execution speed.

BRIEF DESCRIPTION OF THE DRAWINGS

FIG. 10 is a diagram describing a relationship between the source program and machine instructions.

DESCRIPTION OF THE PREFERRED EMBODIMENTS

Before describing preferred embodiments of the invention, program-size reducing techniques discussed by the inventor will be outlined.

One of the program size reducing techniques is a technique using a data compression algorithm such as Huffman coding. The inventor discussed a technique in which a program compressed by an existing data compression algorithm such as the one mentioned above is stored in main storage consisting of a ROM for example, while a CPU is provided with an expanding device for expanding the compressed program, thus reducing the memory usage amount in the main storage. This setup, however, causes an address assignment of each instruction in the program before compression differ from that after compression. For example, with a branch instruction such as a JMP (Jump) instruction, it is necessary for the branch instruction to be executed after changing an operation for branching to a destination address for the pre-compressed program to an operation for branching to a destination address for the compressed program. That is, it is necessary to obtain the address for the compressed program from the address for the pre-compressed program. One possible way to do so is to prepare a table listing relations between the addresses for the pre-compressed program and the addresses for the compressed program and reference the table when an address translation becomes necessary. However, such a table listing the relations between all the addresses requires a very large storage area, increasing the memory usage amount in the main storage rather than reducing it. Another possible address translation technique is to calculate the translation according to some algorithm. However, since the calculation is performed while executing the program, program execution speed may be reduced. The present invention has been made based on the above-mentioned discussion regarding the above-mentioned prior-art techniques.

Figure 2:
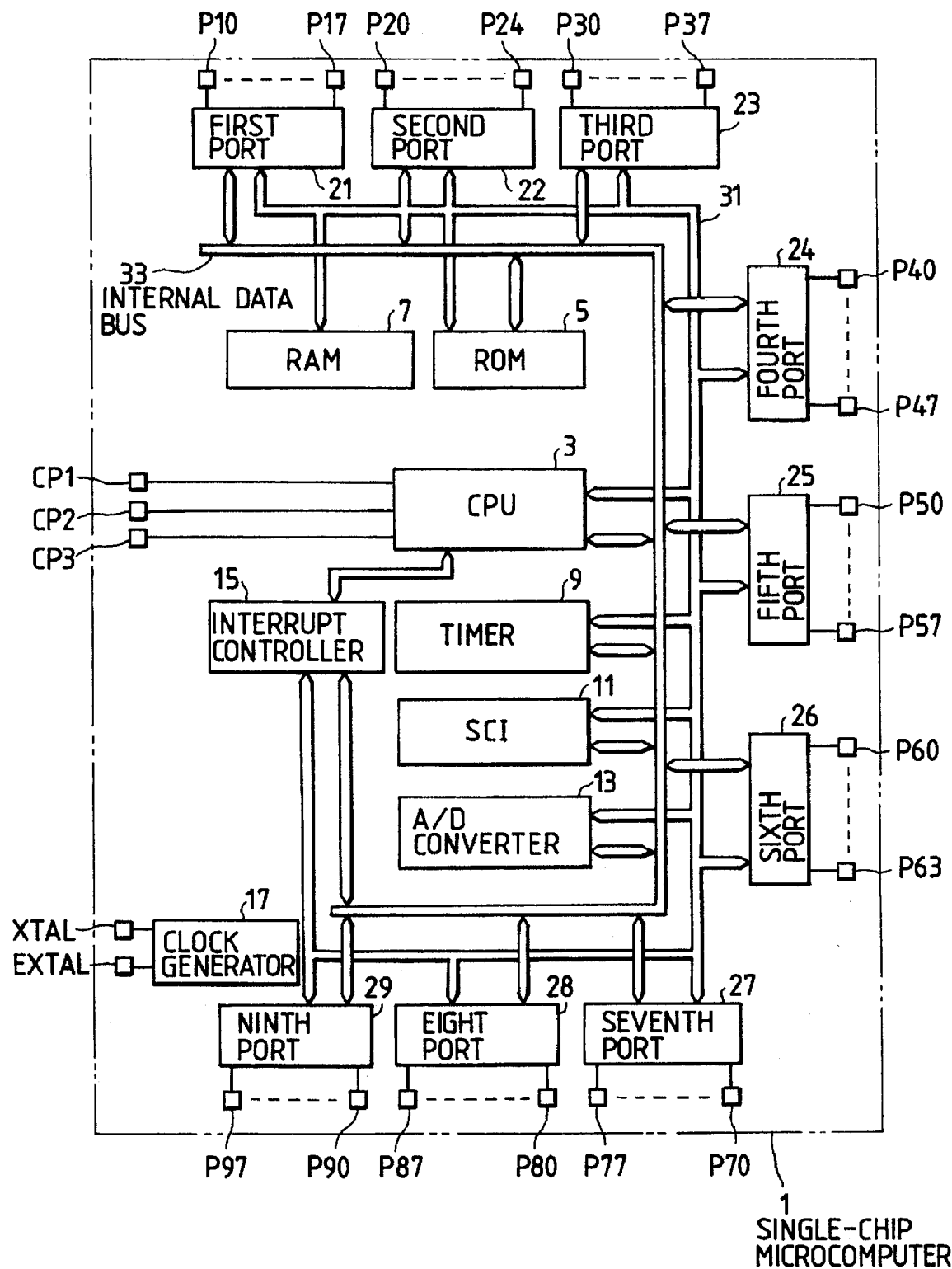
FIG. 2 is a block diagram illustrating an overall constitution of the single-chip microcomputer practiced in accordance with the above-mentioned embodiment of the invention.

Now, referring to FIG. 2, there is shown a single-chip microcomputer 1 associated with one preferred embodiment of the invention. The microcomputer 1 comprises a CPU (Central Processing Unit) 3, a ROM (Read-only Memory) 5, a RAM (Random Access Memory) 7, a timer 9, a serial communication interface (SCI) 11, an A/D converter 13, an interrupt controller 15, and first through ninth ports 21 through 29. These components are commonly connected to an internal address bus 31 and internal bus 33 and formed on one semiconductor substrate made of single-crystal silicon by means of a known semiconductor integrated circuit manufacturing technique.

Figure 6:
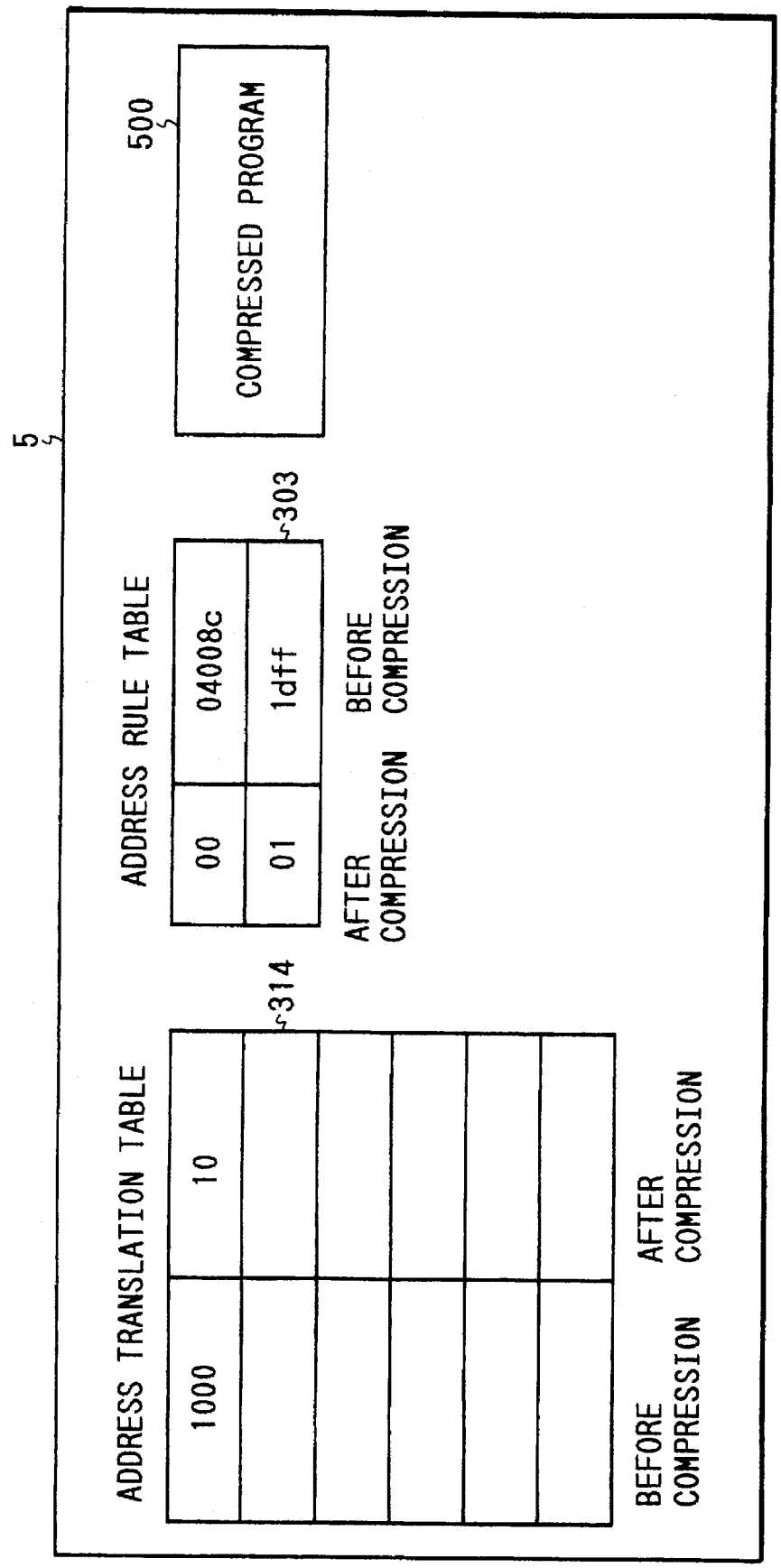
FIG. 6 is a diagram describing contents stored in a ROM contained in the above-mentioned single-chip microcomputer.

A main storage of the single-chip microcomputer 1 of the above-mentioned embodiment is composed of the RAM 7 and ROM 5. The RAM 7 is used for a work area or a data temporary storage area for the CPU 3. The ROM 5 stores an operating program of the CPU 3 in a compressed form, but not limited thereto. As shown in FIG. 6, in addition to a compressed program 500, the ROM 5 stores predetermined table forming information to form an address translation table 314 and a translation rule table 303. The ROM 5 is composed of an EPROM (Electrically Programmable Read-only Memory) to which information can be written by an EPROM writer from outside the microcomputer.

The above-mentioned operating program is stored in the ROM 5 in the compressed form. Program data concerned is fetched by the CPU 3 from the program stored in the ROM 5 and expanded before being executed. In other words, the program data is executed while the main program remains compressed in the ROM. In this embodiment, the program stored in the ROM is not expanded in its entirety before being executed. Rather, data of the compressed program is fetched byte by byte to be expanded before execution. Thus, the present embodiment reduces the storage area in the main storage including the ROM 5 occupied by the operating program.

The above-mentioned semiconductor substrate is formed on its periphery with many electrode pads such as bonding pads. For example, the bonding pads include P10 through P17, P20 through P24, P30 through P37, P40 through P47, P50 through P57, P60 through P63, P70 through P77, P80 through P87, and P90 through P97 connected to input/output pins of the first through ninth ports 21 through 29, and bonding pads XTAL and EXTAL connected to a clock generator 17 at its input terminals, the XTAL being connected at the other end to an oscillator, not shown, and the EXTAL being supplied with an external clock.

The single-chip microcomputer 1 as a chip or pellet constituted as mentioned above is die-bonded on a mounting portion of a package with the above-mentioned bonding pads wire-bonded and is sealed in an assembly process.

The single-chip microcomputer 1 shown in FIG. 2 interfaces with the outside through a variety of ports. A function of each port can be specified by setting a desired operating mode. An operating mode in which outputting an address signal to access an external memory or a peripheral device is also supported by way of example.

Typical operating modes supported by the single-chip microcomputer 1 are a single-chip mode and an extended mode. In the single-chip mode, an operation for accessing by outputting the address signal is entirely disabled or the internal bus is not accessible from the outside the computer. In the single-chip mode, the CPU 3 sequentially reads the operating program from the incorporated ROM 5. In so doing, almost all ports are made available to user through the timer 9 and the SCI 11. In the extended mode, a particular port is assigned to an address output or a data input/output to make accessible an external memory or a peripheral device. According to a type of an extended mode to be set, an address map of an internal circuit module is changed and input/output signals are reassigned to the ports. For example, if the extended mode is set, an address space to be assigned to the ROM 5 is made an external memory space and module select signals to the ROM 5 are all disabled, so that the ROM 5 becomes unavailable in terms of both software and hardware and is treated as if the ROM 5 does not exist. In such a situation, the operating program of the CPU 3 is read from the external program.

The operating mode setting as mentioned above is performed according to a combination of signal levels supplied via control signal input pads CP1 through CP3 for indicating an operating mode of the CPU 3. For example, the operating mode is set when a signal supplied from the control signal input pads CP1 through CP3 is latched by a mode control register, not shown, in a predetermined timing at a time of a reset operation.

The above-mentioned single-chip microcomputer 1 has a test mode in which a fault can be easily diagnosed from the outside at device testing for enhancing testing efficiency. When the test mode is set by a combination of signal levels entered at predetermined terminals, the internal bus is freed directly to the outside via a predetermined port.

Figure 1:
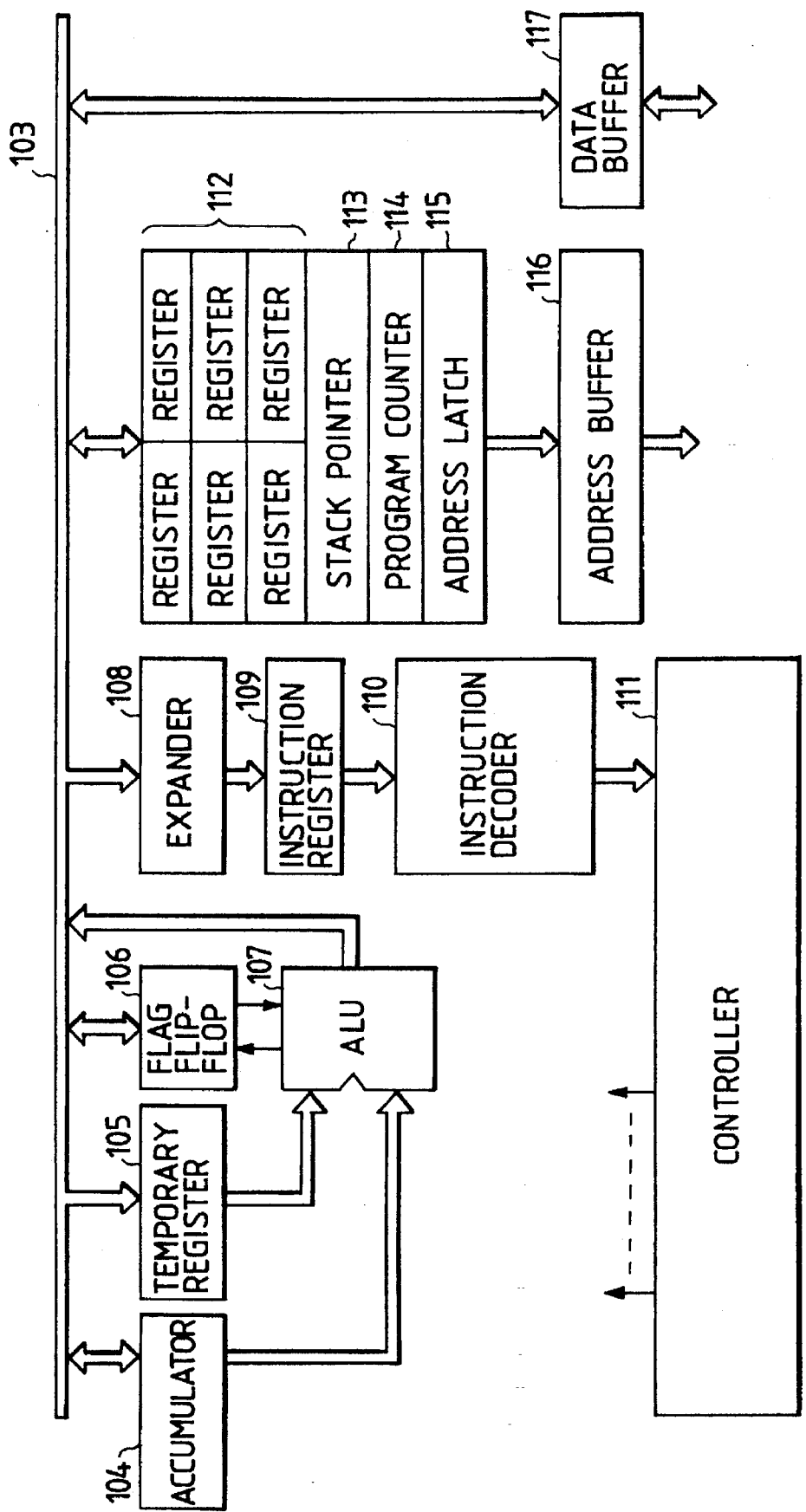
FIG. 1 is a block diagram illustrating a constitution of a CPU used in a single-chip microcomputer practiced as one preferred embodiment of the invention.

Now, referring to FIG. 1, there is shown a constitution of the CPU 3 by way of example.

An arithmetic and logic unit (ALU) 107 is a hardware unit for performing necessary arithmetic and logic operations on data. Arithmetic operations include addition, subtraction, multiplication, and division. Logic operations include disjunction (OR) and conjunction (AND). These operations are executed based on a binary adder. The ALU 107 is provided with a flag flip-flop 106 for holding a variety of states caused in the course of each operation. In addition to the ALU 107, the CPU 3 comprises a register 105 for temporarily holding data to be operated on in the ALU, an accumulator 104 for storing one of inputs for an operation or a result of the operation, general registers 112 for holding a variety of data, stack pointer 113 for indicating top of a stack area in which contents of a variety of registers are saved at execution of a subroutine, a program counter 114 for indicating an instruction address to be executed next, an address latch 115 for temporarily holding an output address, and a data buffer 117 for implementing data transfer with the outside of the CPU. These components are interconnected over an internal bus 103. Reference numeral 116 indicates an address buffer for implementing an address output operation.

Reference numeral 108 indicates an expander, which is connected to the internal bus 103 to expand compressed program data fetched from the ROM 5 (FIG. 2) into a pre-compression form. The ROM 5 stores an executable program in compressed form. That is, the expander 108 has a data length converting capability for converting program data compressed to 8 bits for example into 16 bits for example. Expanding means according to the present invention is composed of this expander 108. The expander 108 is followed by an instruction register 109 for holding an instruction code obtained by expanding the program data by the expander 108. The instruction register 109 is followed by an instruction decoder 110 for interpreting the instruction by decoding the instruction code held in the instruction register 109. A result of the decoding is sent to a controller 111 that follows the instruction decoder 110. The controller 110 sends an appropriate control signal to the inside and outside of the CPU 3 to execute in steps an operation specified by the decoded instruction.

Figure 3:
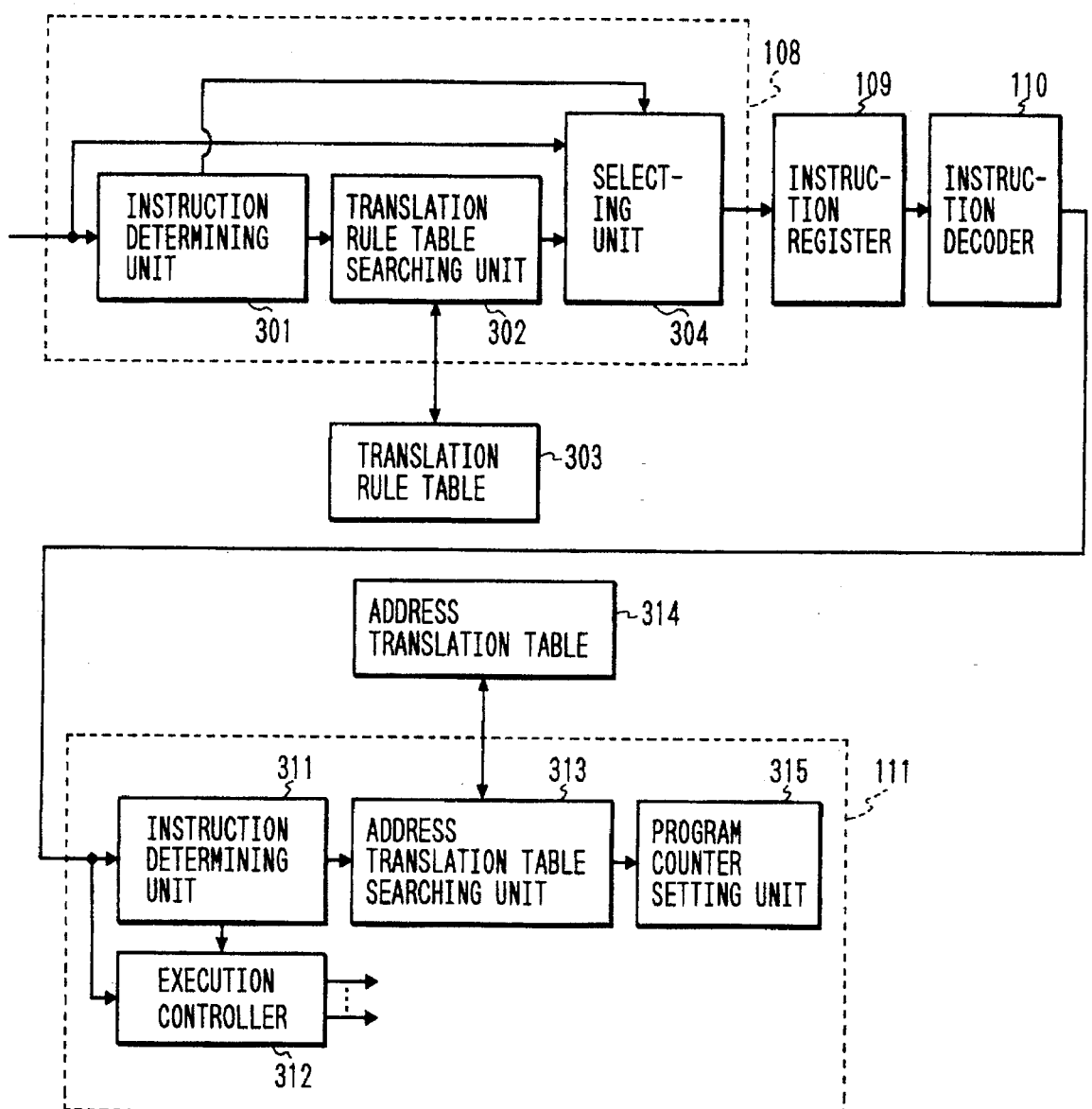
FIG. 3 is a block diagram illustrating functions of an expander and a controller contained in the CPU.

Referring to FIG. 3, there are shown main functional blocks of the expander 108 and the controller 111.

The expander 108 comprises instruction determining unit 301 for determining whether the compressed program data fetched from the ROM 5 is subject to expansion, a translation rule table searching unit 302 for expanding, based on a determination result, the fetched compressed program data into the pre-compression form, and a selecting unit 304 for selectively sending the fetched data or an instruction searched by the translation rule table searching unit 302 according to the determination result obtained from the instruction determining unit 301. The translation rule table search unit 302 searches the translation rule table 303 to read an instruction code corresponding to the fetched compressed program data for expansion.

The controller 111 comprises an instruction determining unit 311 for determining whether the instruction decoded by the instruction decoder 110 is a branch instruction, an address translation table searching unit 313 for searching, if the decoded instruction has been determined to be a branch instruction, an address translation table 314 to convert a branch destination address into a branch destination address in the compressed program, a program counter setting unit 315 for setting the branch destination address obtained by the conversion to the program counter (FIG. 1), and an execution controller 312 for controlling operations of the ALU 109 and a variety of registers according to the output of the instruction decoder 110.

The term "branch instruction" used herein is a generic name for those instructions which are required to change an instruction execution sequence, such as a subroutine jump instruction and an interrupt handling instruction. The branch destination address denotes an address (instruction address) at which an instruction to be executed next is written (stored). That is, when the CPU 3 executes a series of instructions whose execution sequence need not be changed, a value of the program counter 114 is incremented each time the CPU 3 executes one instruction to indicate a value of an instruction address to be executed next. On the other hand, when the CPU 3 executes an instruction whose execution sequence must be changed, the value of the program counter 114 is not incremented as mentioned above; rather the program counter 114 is set by the change of the execution sequence to a value of an address (branch destination address) to be executed next.

Now, the operating program to be stored in the ROM 5 will be described in detail.

Figure 7:
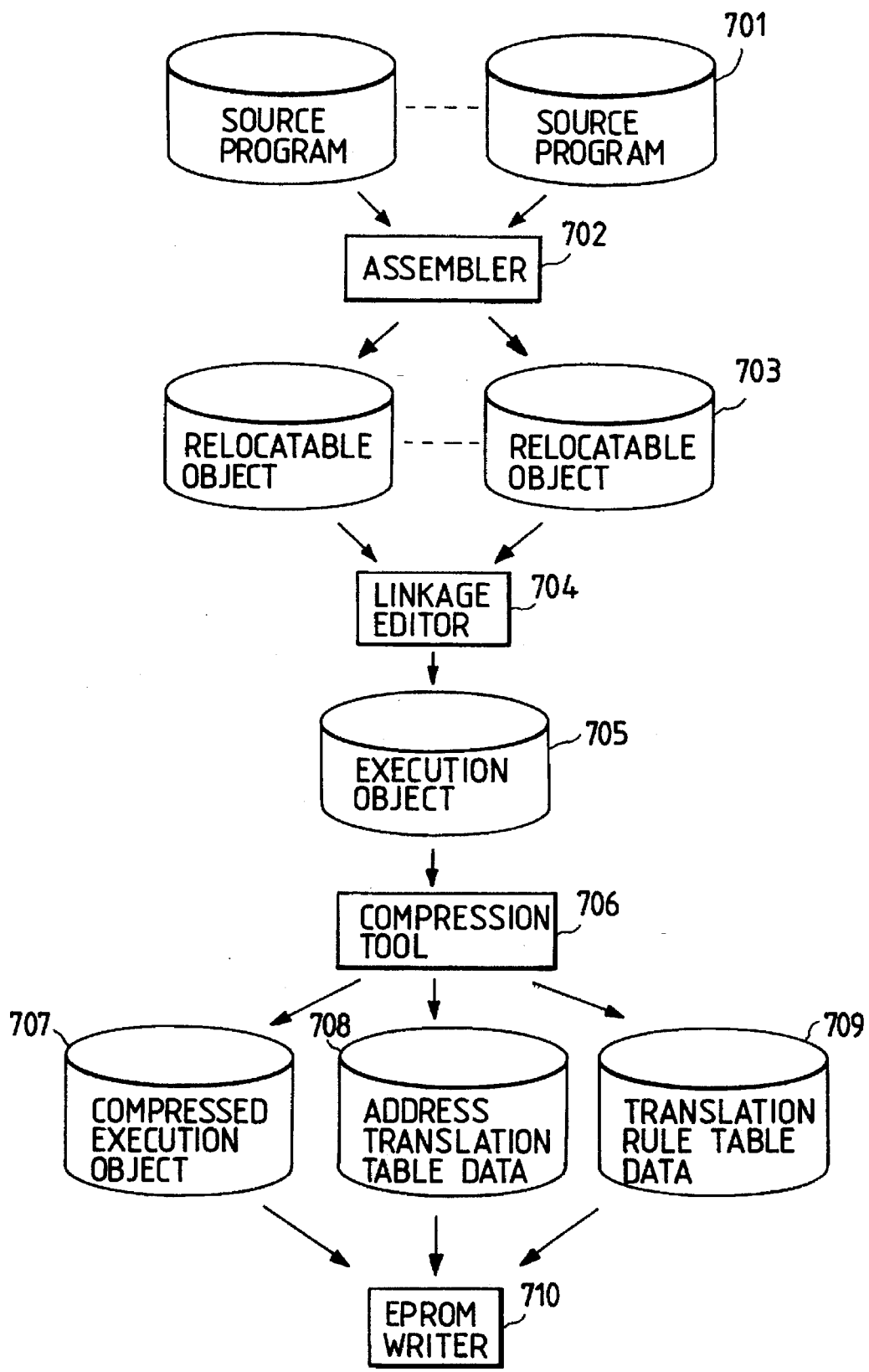
FIG. 7 is a flowchart indicating processing from source program assembling to writing the resultant program to the ROM.

Referring to FIG. 7, there is shown a flow of processing from assembling a source program up to writing the assembled source program to the ROM.

A source program 701 written in an assembly language, but not limited thereto, is converted by an assembler 702 into a machine code, providing a relocatable object 703. FIG. 10 shows a relationship between the source program and the machine code. A linkage editor 704 captures a plurality of relocatable objects 703 to generate an execution object 705. Each relocatable object is composed of an external symbol table, a text, and a relocation link table. The external symbol table lists all external symbol names to be referenced from inside a module concerned and symbol names to be defined inside the module and referenced from another module. The execution object thus obtained is compressed by a compression tool 706 to provide a compressed execution object (compressed program). At this time, address translation table data 708 for forming the address translation table 314 (FIG. 3) and translation rule table data 709 for forming the translation rule table 303 (FIG. 3) are generated. The compressed execution object 707, the address translation table data 798, and the translation rule table data 709 are written to the ROM 5 (FIG. 2) through an EPROM writer 710.

Figure 8:
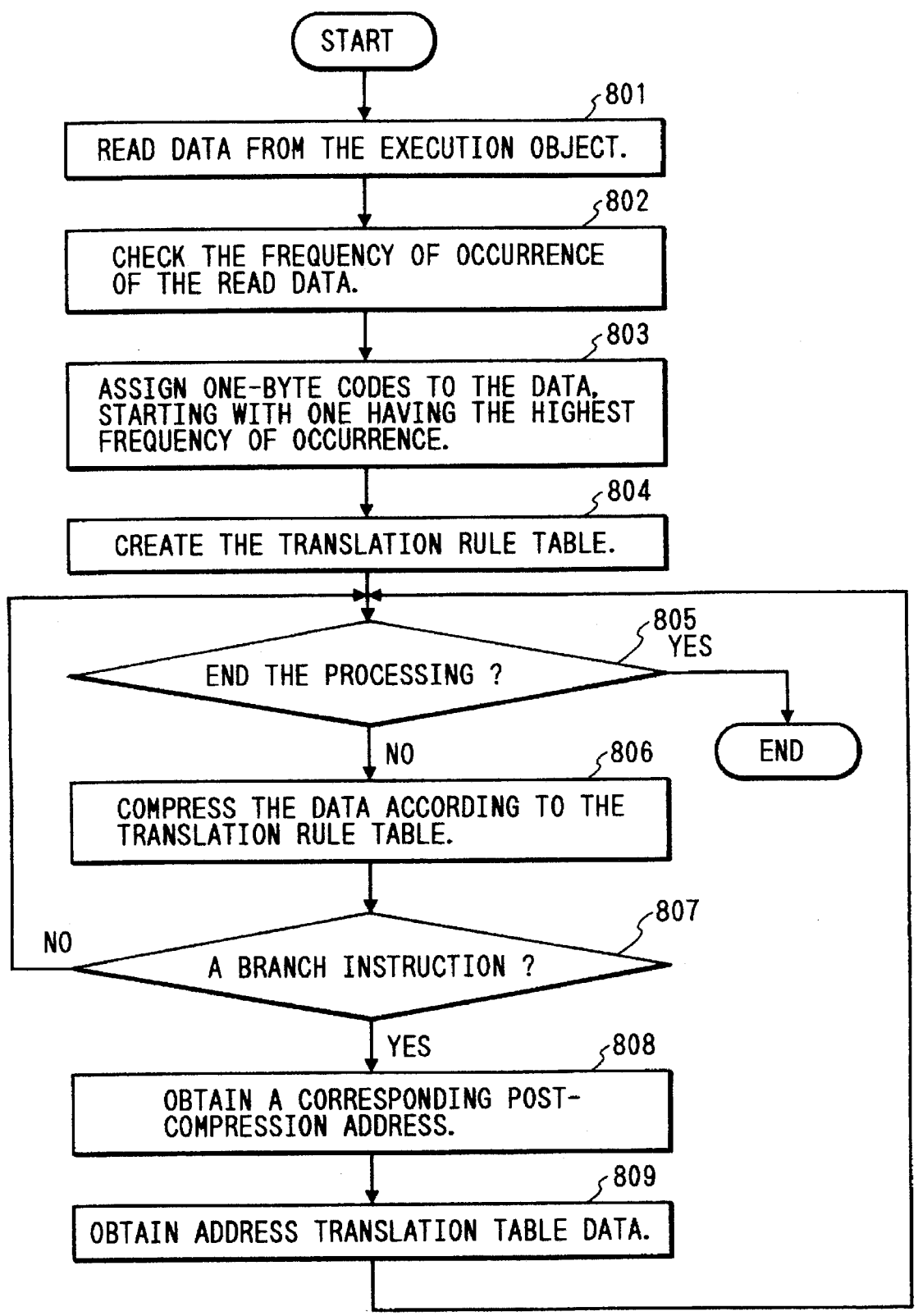
FIG. 8 is a flowchart indicating compression processing included in the above-mentioned processing.

FIG. 8 shows a flow of compression processing in the compression tool 706.

In the present embodiment, since instruction fetch is performed on a byte basis, multi-byte string data having a high frequency of occurrence is simply compressed on a byte basis, while no such compression processing is performed on data having a low frequency of occurrence. The latter data is distinguished from the former data by placing a predetermined prefix in front of the latter data. This compression processing will be described in detail below.

Figure 5:
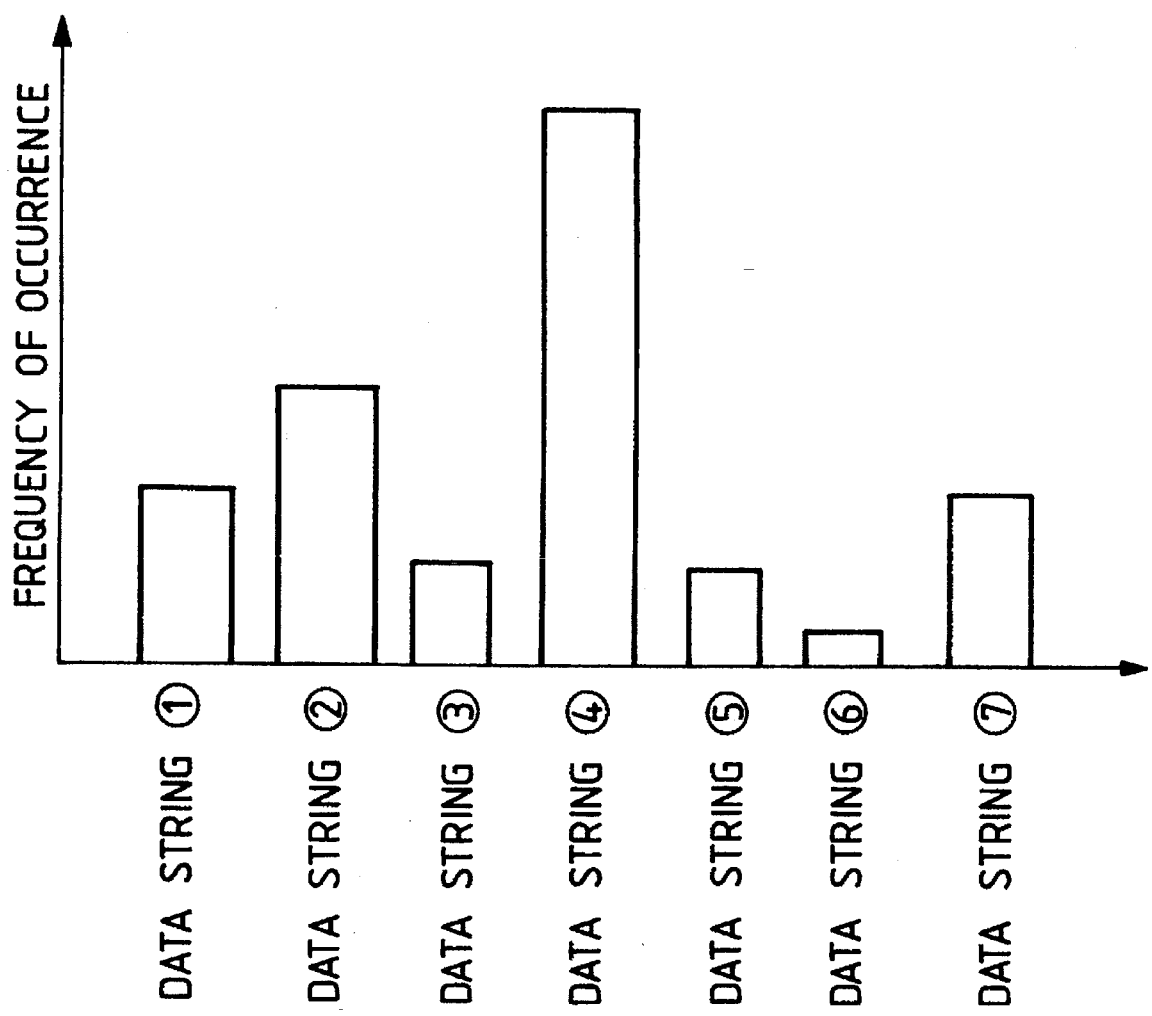
FIG. 5 is a diagram describing a frequency of occurrence of instructions constituting a program.

As shown in FIG. 8, data in the execution object is all read (801) and checked for frequency of occurrence (802). The frequency of occurrence is obtained by checking the program data on a multiple byte basis, for example 2 or 3 bytes, but not limited thereto, from a beginning of the execution object. FIG. 5 shows an example of the frequency of occurrence of the data contained in the execution object. In this example, a frequency of occurrence of byte string data ④ is the highest, sequentially followed by those of byte string data ②, byte string data ⑦, byte string data ①, byte string data ③, byte string data ⑤ and byte string data ⑥, the last being the lowest. One-byte codes 00, 01, 02 and so on for example are assigned to these byte code data in the above-mentioned order, that is from byte string data having the highest frequency of occurrence to the byte string data having the lowest (803). By the assignment of one-byte codes, the translation rule table 303 is formed. That is, the table 303 listing the relationship between one-byte instructions and corresponding machine codes is created. By referencing the translation rule table 303 thus created, the program compression is performed as follows.

First, it is determined whether to end the compression processing on the execution object in its entirety (805). If it is determined that the compression processing will continue, program data is converted into a corresponding one-byte code according to the translation rule table 303 created in the step 804 to be compressed (806). At this time, it is possible to determine from the program data to be processed whether the data contains a branch destination address, or whether the data subject to the compression processing corresponds to a branch instruction (807). If a branch destination address is found in the determination, a corresponding post-compression address (the branch destination address in the compressed program) is obtained (808) to provide data 708 for creating the address translation table 314. This branch destination address conversion is performed because the address assignment of the program before compression and the address assignment after compression is different. Consequently, with a branch instruction such as a JMP (Jump) instruction for example, an operation for jumping to the address of the program before compression must be changed to an operation for jumping to the post-compression address to prevent an instruction execution routine started by the above-mentioned branch instruction from causing an error.

Then, unless it is determined in the step 805 that there is no non-compression instruction, or until all instructions constituting the operating program have been processed, the above-mentioned steps 806 through 809 are repeated.

As mentioned above, in the present embodiment, byte string data having low frequencies of occurrence are not subjected to compression and therefore no one-byte compression representation mentioned above is performed on these data. The original byte string data are kept disposed without change. To distinguish such non-compressed byte string data from the compressed data, each non-compressed byte string data is prefixed with a symbol ff or the like. Thus, any one-byte code that follows the prefix ff is known as non-compressed data. The instruction determining unit 301 of FIG. 3 checks data for the prefix ff to determine whether the data requires expansion or not. That is, if the data is found prefixed with ff, the data is not compressed and therefore will not be subjected to expansion processing.

Figure 4:
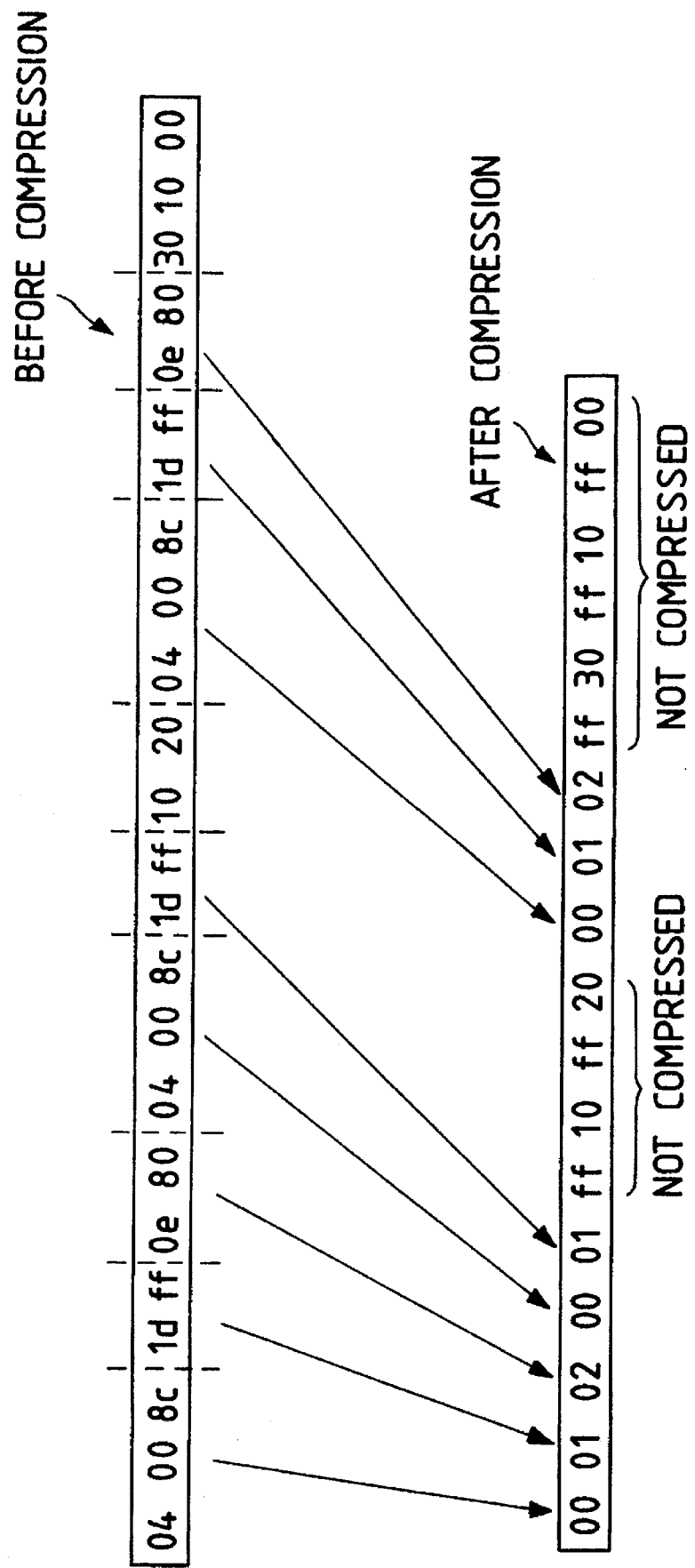
FIG. 4 is a diagram comparing program images before compression with that after compression.

According to machine code data shown in FIG. 10, program images before and after compression are as shown in FIG. 4. For example, three-byte string data 04 00 8C before compression has the highest frequency of occurrence and therefore is assigned with one-byte code 00; two-byte string data 1d ff having the next highest frequency of occurrence is assigned with one-byte code 01; and two-byte string data 0e 80 having the third highest frequency of occurrence is assigned with one-byte code 02. Then, when the translation rule table 302 is created, it is referenced in the compression processing to convert the three-byte string data 04 00 8C into the one-byte code 00, the two-byte string data 1d ff into the one-byte code 01, and the two-byte string data 0e 80 into the one-byte code 02. Thus, assigning data of two bytes or more to one-byte codes reduces the amount of program data.

It should be noted that, in the compressed data of FIG. 4, each one-byte code immediately following prefix ff is known as non-compressed data because it follows the prefix fl. That is, two-byte string data 10 20 and three-byte string data 30 10 00 are not subjected to compression because they have low frequencies of occurrence.

Figure 9:
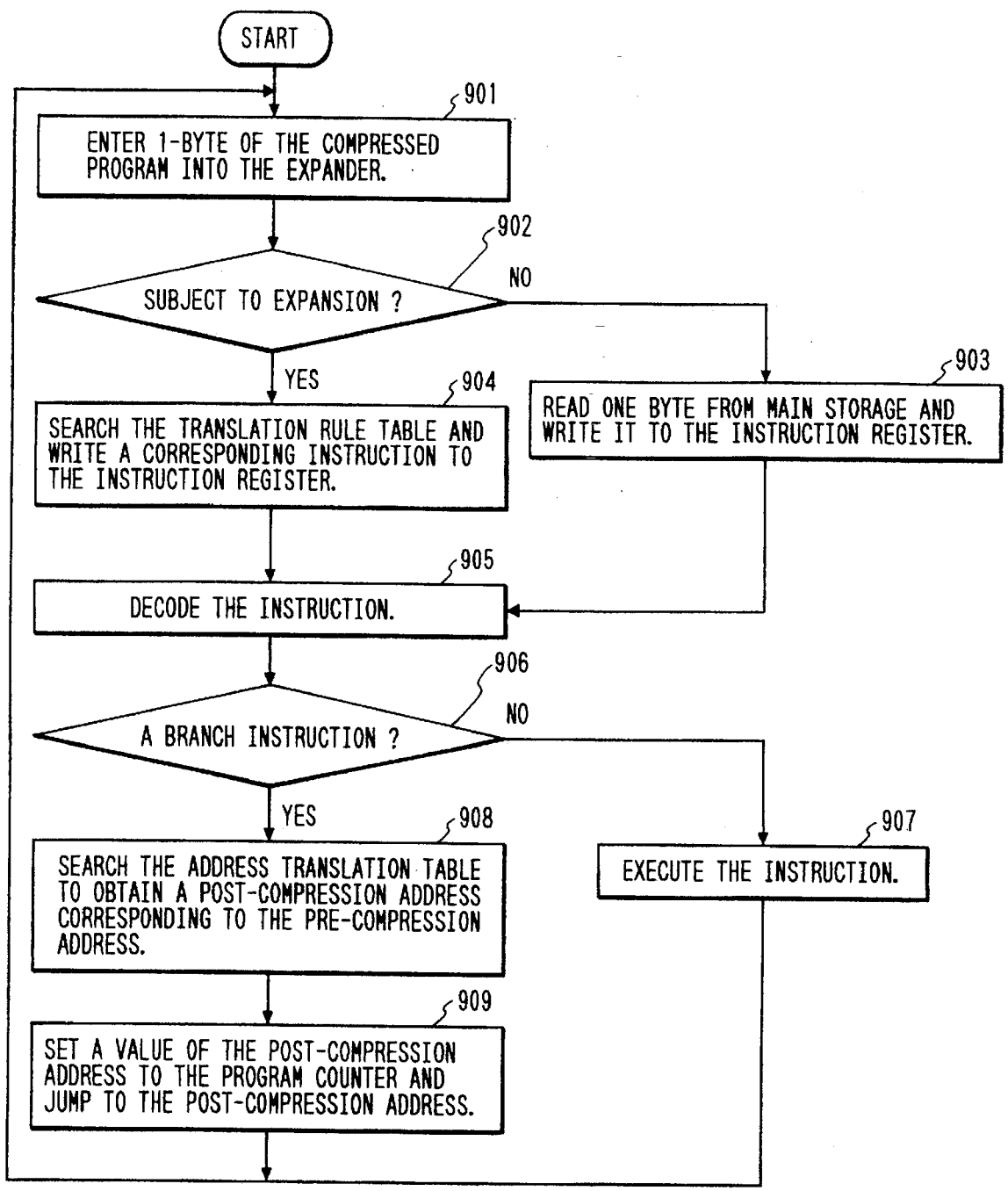
FIG. 9 is a flowchart indicating execution of an instruction on the above-mentioned single-chip microcomputer.

Now, a manner in which an instruction is executed in the microcomputer according to the present embodiment incorporating the ROM 5 storing the above-mentioned compressed program, the address translation table 314, and the translation rule table 303 (FIG. 6) will be described with reference to the flowchart of FIG. 9.

First, the compressed program data is fetched from the ROM 5 byte by byte (901) and the instruction determining unit 301 determines whether the data is to be expanded or not (902). Basically, if the fetched one-byte data is found prefixed with ff, the processing proceeds to step 903. If the fetched one-byte data is not preceded by the prefix ff, the processing proceeds to step 904 in which the fetched one-byte data is regarded as being subject to expansion. Then, the translation rule table 303 is searched by the translation rule table searching unit 302 to obtain a corresponding instruction code. The obtained instruction code is written to the instruction register 109 (904). For example, if the fetched data is 00, a corresponding instruction code is 04008c from the translation rule table. This code is written to the instruction register 109 on a byte basis and then decoded by the instruction decoder 110 (905). On the other hand, if the prefix ff has been fetched, an immediately following instruction is not compressed and therefore written to the register 109 without searching the translation rule table 303 (903). The instruction is then decoded by the instruction decoder 110 (905).

Then, the instruction determining unit 311 in the controller 111 (FIG. 3) determines whether the decoded instruction is a branch instruction or not (906). For example, referring to FIG. 10, if the instruction is found by the instruction determining unit 311 to be a jump instruction JMP to label L: (address 0100), the address translation table 314 is searched by the address translation table searching unit 313 to obtain a corresponding branch destination address (908). The obtained branch destination address is equal to the branch destination address in the compressed program data stored in the ROM 5. The obtained branch destination address is set by the program counter setting unit 315 to the program counter 114. The processing jumps to the branch destination address in the compressed program (909) to return to the step 901 to read the compressed program. If, in the step 906, the decoded instruction is not a branch instruction, a control operation appropriate to the instruction is performed to execute it.

According to the above-mentioned embodiment of the invention, the following advantages and features, but not limited thereto, are obtained.

(1) Since compressed program data is fetched byte by byte from the ROM 5 that stores an executable program in compressed form and the fetched program data is expanded to a pre-compression form before being decoded for execution, a memory usage amount in the main storage including the ROM 5 can be reduced. For example, in a general microcomputer application program, a branch label occurs approximately every 20 bytes and a size of the entire program is 10K bytes to several hundred K bytes. Therefore, if a compression ratio of the application program is 50%, the number of translation rules for creating the translation rule table 303 is 3 bytes×200, and a size of the address translation table 314 is 4 bytes×(program size)×(1/20), an application program of 10K bytes is compressed to 7.6K bytes and an application program of 60K bytes to 43.6K bytes for example, thus significantly reducing the memory usage amount in the main storage including the ROM 5.

(2) Since, in executing a compressed program, an address assignment of the program before compression is different from that after compression, a branch instruction such as a JMP (Jump) for example must be executed by changing an operation for branching to a pre-compression address in the program to an operation for branching to a post-compression address. Conventionally, if obtaining a post-compression address from a pre-compression address requires to prepare a table listing the relations between all addresses and perform address translation, the relation table is referenced to obtain a corresponding branch destination address. According to the above-mentioned embodiment of the invention, however, the address translation table 314 indicating the relation between the branch destination address in a program before compression and the branch destination address in a compressed program is formed in the ROM 5 to be searched for branch destination address translation. Consequently, the size of the address translation table is only about 4 bytes× (program size)×(1/20), thus preventing the memory usage amount from growing as with preparing the address table for all addresses as mentioned above. If, in translating an address in a pre-compression program into an address in a compressed program, a calculation based on some algorithm is used, the calculating operation performed concurrently with program execution may lower the program execution speed. According to the above-mentioned embodiment, however, the branch destination address translation is performed by searching the address translation table 314, thereby preventing the program execution speed from being adversely affected.

While the preferred embodiment of the invention has been described using specific terms, such description is for illustrative purposes only, and it is to be understood that changes and variations may be made without departing from the spirit or scope of the appended claims.

For example, in the above-mentioned embodiment, the ROM 5 and/or RAM 7 may be arranged outside the single-chip microcomputer 1.

In the above-mentioned embodiment, the ROM 5 has been described as being implemented by EPROM. It will be appreciated by those skilled in the art that the ROM 5 can also be implemented by EEPROM (Electrically Erasable and Programmable Read-only Memory) or a mask ROM in which information can be written by selectively implanting ion in a predetermined memory cell transistor through a user-specified photo mask.

In the above-mentioned embodiment, the program is written in assembly language. It will be appreciated by those skilled in the art that the invention is applicable also to a program written in another programming language.

In the above-mentioned embodiment, instructions having low frequency of occurrence in the compressed program data stored in the ROM 5 are not compressed. However, the embodiment may be constituted so that all instructions are compressed regardless of their frequency of occurrence. In the above-mentioned embodiment, the frequency of occurrence is obtained in a unit of multiple-byte string data and the multiple-byte strings are converted into one-byte codes, starting from the string having the highest frequency of occurrence and downward. It is also possible to obtain the frequency of occurrence on an instruction basis for one-byte code conversion starting from an instruction having the highest frequency of occurrence.

It will also be appreciated by those skilled in the art that the translation rule table 303 and/or the address translation table 314 may be formed in the RAM 17.

In the above, the invention has been described with reference to the case in which the invention is applied to the single-chip microcomputer, the application field that provided a background to the invention. However, the present invention is not limited thereto; it is applicable also to a generally available single-chip microcomputer having no incorporated program ROM 5 and to arithmetic processing in a variety of data processing apparatuses.

The present invention is applicable on condition that at least predetermined arithmetic processing is performed by sequentially decoding and executing a series of instructions constituting a program.

Typical effects to be implemented by the disclosure will be outlined as follows.

Fetching compressed program data from a storage device storing a program in compressed form, expanding the fetched data to a pre-compression form, and decoding the expanded data for execution allow the memory usage amount in main storage to be reduced and a semiconductor chip implementing the invention to be reduced in size and cost. Further, converting a branch destination address to a branch destination address in the compressed program according to a result of the above-mentioned decoding and setting the branch destination address obtained by the conversion to the program counter allow even a branch instruction to be executed correctly, and performing the branch destination address conversion through the address translation table prevents arithmetic processing speed from dropping.

What is claimed is:

1. A method of executing compressed program data in a microcomputer, the compressed program data provided by compressing a program having a plurality of instructions and stored in a memory, the compressed program data addressable by a plurality of addresses, comprising the steps of:

fetching data from a predetermined address in said compressed program data stored in the memory, wherein the predetermined address is provided by a program counter;

expanding said fetched data;

decoding said expanded data;

determining whether the decoding indicates a change in compressed program execution sequence;

executing an operation in accordance with the result of said decoding;

generating an address for said compressed data program indicating the next data of said compressed data program to be fetched by incrementing the predetermined address if the decoding does not indicate a change in the compressed program execution sequence; and generating a branch address for said compressed data program to indicate a destination address in said compressed data program by extracting a compressed branch address from a compressed address translation table if the decoding indicates a change in the compressed program execution sequence.

2. A method according to claim 1 further comprising the steps of:

determining from the data fetched in said fetching step if said compressed program data requires expansion in said expanding step;

wherein, if said fetched data is determined to require expansion, then said fetched data is expanded in said expanding step; and wherein, if said fetched data is determined not to require expansion, then said fetched data is decoded in said decoding step without performing the expanding step.

3. A microcomputer comprising:

program counter means for indicating an instruction address;

storage means for storing compressed program data provided by compressing a program having a plurality of instructions, said storage means being connected to said program counter means;

expanding means including means for fetching data from the instruction address indicated by said program counter means and means for expanding the fetched data;

decoding means for decoding the expanded data from said expanding means;

execution means for executing operations in response to the decoding of the expanded data by the decoding means;

execution sequence determining means coupled to said decoding means for determining whether the decoding by said decoding means indicates a change in instruction execution sequence;

address generation means including a compressed address translation table for generating a branch address indicating a destination address within said compressed program data by extracting a compressed branch address corresponding to the branch address included in said fetched data from the compressed address translation table; and setting means for setting the address generated by said address generation means in said program counter means in response to an indication of a change in the instruction execution sequence, and for incrementing the instruction address in said program counter means in response to an indication of no change in the instruction execution sequence.

4. A microcomputer according to claim 3, wherein said expanding means comprises:

determining means for determining if said expansion of the fetched data is necessary;

wherein, if said expansion is determined to be necessary, then the data expanding means expands said fetched data; and wherein, if said expansion is determined to be unnecessary, then said fetched data is supplied to said decoding means without expansion.

5. A microcomputer according to claim 4, wherein said data expanding means comprises:

a translation rule table containing expanded data corresponding to fetched data from the stored compressed program data; and first searching means for searching said translation rule table to determine if expansion is necessary for the fetched data.

6. A microcomputer according to claim 5, wherein said address generation means comprises:

the compressed address translation table containing a branch destination instruction address in program data before compression and a corresponding branch destination instruction address in the program data after compression; and second searching means for searching said compressed address translation table based on the branch destination instruction address before compression wherein the corresponding branch destination instruction address after compression is generated by the address generation means.

7. A microcomputer according to claim 5, wherein said expansion is performed by assigning a data string having a relatively high frequency of occurrence in the program data before compression to a predetermined byte of data of the compressed program data.

8. A microcomputer according to claim 3, wherein said expanding means comprises:

determining means for determining if said expansion of said fetched data is necessary;

wherein, if said expansion is determined to be necessary, then the data expanding means expands said fetched data; and wherein, if said expansion is determined to be unnecessary, then said fetched data is supplied to said decoding means without expansion.

9. A microcomputer according to claim 8, wherein said data expanding means further comprises:

a translation rule table containing expanded data corresponding to fetched data from the stored compressed data program; and first searching means for searching said translation rule table to determine if expansion is necessary for the fetched data.

10. A microcomputer according to claim 3, wherein said address generation means comprises:

the compressed address translation table containing a branch destination instruction address in program data before compression and a corresponding branch destination instruction address in program data after compression; and second searching means for searching said compressed address translation table based on the branch destination instruction address before compression wherein the corresponding branch destination instruction address after compression is generated by the address generation means.

11. A microcomputer according to claim 3 further comprising a semiconductor substrate on which said microcomputer is disposed.

12. A microcomputer according to claim 9 further comprising a semiconductor substrate on which said microcomputer is disposed.

13. A microcomputer according to claim 10 further comprising a semiconductor substrate on which said microcomputer is disposed.

14. In a microcomputer for use with a memory which stores a compressed program which has been provided by compressing a program having a plurality of instructions, the microcomputer comprising:

a program counter generating an address by an increment operation, the generated address indicating an address of the compressed program;

a data expander expanding data of the compressed program indicated by the address generated by the program counter;

an instruction decoder decoding the expanded data and generating an output;

an execution unit executing an operation in accordance with the output of the instruction decoder;

an instruction determination unit, responsive to the output of the instruction decoder, determining whether the operation to be executed by the execution unit includes a branch operation;

an address generation unit including a compressed address translation table and generating destination address data for indicating a destination in the compressed program by extracting compressed branch address data from the compressed address translation table if the instruction determination unit has determined that the operation to be executed by the execution unit includes the branch operation; and a setting unit setting the generated destination address data to the program counter if the instruction determination unit has determined that the operation to be executed by the execution unit includes a branch operation, wherein data from the destination in the compressed program indicated by the destination address data is expanded by the data expander and executed by the execution unit.

15. A microcomputer according to claim 14, wherein the memory and the microcomputer are formed on a single chip.

16. A microcomputer according to claim 14, wherein the address generation unit includes:

the compressed address translation table including a plurality of destination data for indicating destination addresses for branch operations in the program before being compressed and a plurality of destination address data corresponding to the plurality of destination data and which indicate destination addresses in the compressed program; and a compressed address translation table search unit which searches the plurality of destination data to find destination data if the instruction determination unit has determined that the operation to be executed by the execution unit includes a branch operation.

17. A microcomputer according to claim 16, wherein the data expander comprises:

a data determination unit determining whether expansion is required of the data of the compressed program indicated by the address generated by the program counter; and a selecting unit which provides the data of the compressed program indicated by the address generated by the program counter to the instruction decoder without expansion if expansion of the data is not required and which provides the expanded data to the instruction decoder if expansion of the data is required.

18. A microcomputer according to claim 17, wherein the memory is a read-only memory.

19. A microcomputer according to claim 15, wherein the memory is a read-only memory.

20. A microcomputer executing a compressed program of instructions addressable by addresses, the instructions of the compressed program addressable by addresses, the compressed program generated by compressing an initial program of instructions, comprising:

a program counter storing an address indicating an instruction of the compressed program;

a memory storing instructions of the compressed program;

an instruction expander coupled to the memory, the instruction expander sequentially receiving and selectively expanding the instructions of the compressed program and generating instructions corresponding to the initial program;

an instruction decoder decoding instructions from the instruction expander and generating an output;

an execution unit executing the instructions from the instruction expander in response to the instruction decoder output;

an address translator including a compressed address translation table and generating the compressed branch addresses indicating addresses in the compressed program by extracting a compressed branch from the compressed address translation table, wherein, in response to an output which is provided from the instruction decoder and which indicates a change in sequence of the compressed program, the address translator stores in the program counter the compressed branch address in the compressed program so that an instruction at the address indicated by the compressed branch address can be executed in response to the change in sequence of the compressed program.

21. The microcomputer of claim 20, wherein the instruction expander comprises an instruction translation table containing instructions of the compressed program and corresponding instructions of the initial program, wherein, in response to an instruction from the compressed program, a corresponding instruction of the initial program is provided to the instruction decoder.

22. The microcomputer of claim 21, wherein the compressed address translation table contains addresses of instructions of the compressed program and corresponding addresses of the initial program, wherein the addresses of the compressed program comprise addresses of instructions for which an output of the instruction decoder indicate a change in sequence of the compressed program.

23. The microcomputer of claim 20, wherein the microcomputer is implemented on a semiconductor substrate.

24. The microcomputer of claim 21, wherein the instruction translation table contains instructions of the initial program having a high frequency of occurrence, wherein instructions of the initial program having a high frequency of occurrence are compressed in the compressed program.

25. In a microcomputer for use with a memory which stores a program which has been compressed, the microcomputer comprising:

a program counter generating an address of the compressed program;

a data expander selectively expanding data of the compressed program indicated by the address generated by the program counter;

an instruction decoder decoding the expanded data and generating an output;

an execution unit executing an operation in accordance with the output of the instruction decoder;

an instruction determination unit responsive to the output of the instruction decoder, determining whether the operation to be executed by the execution unit includes a branch operation;

an address generation unit generating compressed destination address data indicating a destination in the compressed program if the instruction determination unit has determined that the operation to be executed by the execution unit includes a branch operation, wherein the address generation unit includes:

a compressed address translation table including a plurality of destination data indicating destination addresses for branch operations in the program before being compressed and a plurality of compressed destination address data which correspond to the plurality of destination data and which indicate compressed destination addresses in the compressed program; and an address table search unit which searches the plurality of destination data to find compressed destination address data if the instruction determination unit has determined that the operation to be executed by the execution unit includes the branch operation; and a setting unit setting the compressed destination address data to the program counter if the instruction determination unit has determined that the operation to be executed by the execution unit includes a branch operation;

wherein data indicated by the compressed destination address data in the compressed program is expanded by the data expander and executed by the execution unit.

26. A microcomputer according to claim 25, wherein the memory comprises read-only memory.

27. A microcomputer according to claim 25, wherein the microcomputer and the read-only memory are formed on a single chip.

* * * * *